INVENTOR.
ABRAHAM LICHOWSKY
BY Samuel Cohen
ATTORNEY

STORAGE SYSTEM EMPLOYING MAGNETIC TAPE CARTRIDGES

Filed May 31, 1966 6 Sheets-Sheet 2

INVENTOR.
ABRAHAM LICHOWSKY
BY [signature]
ATTORNEY

INVENTOR.
ABRAHAM LICHOWSKY
BY Samuel Cole
ATTORNEY

INVENTOR.
ABRAHAM LICHOWSKY
BY
ATTORNEY

INVENTOR.
ABRAHAM LICHOWSKY
BY
ATTORNEY

INVENTOR.
ABRAHAM LICHOWSKY
BY
ATTORNEY

United States Patent Office 3,525,086
Patented Aug. 18, 1970

3,525,086
STORAGE SYSTEM EMPLOYING MAGNETIC TAPE CARTRIDGES

Abraham Lichowsky, Los Angeles, Calif., assignor to RCA Corporation, a corporation of Delaware
Filed May 31, 1966, Ser. No. 554,169
Int. Cl. G11b *5/52, 15/38, 23/04*
U.S. Cl. 340—174.1 6 Claims

ABSTRACT OF THE DISCLOSURE

A plurality of tape magazines are located on a ferris wheel like structure. A read-write station adjacent to this structure is common to all magazines and includes transducer means continuously driven along a circular path lying in a plane. In response to an input address, the ferris wheel like structure is rotated until a particular one of the magazines is moved into operative relationship with the read-write station. A vacuum system at the read-write station thereupon removes a loop of tape from the magazine and places a portion of the loop in a plane parallel and immediately adjacent to the plane in which the transducer is driven.

This invention relates to a new and improved, large capacity storage system for binary, video or other information. More particularly, the invention relates to a system employing a plurality of lengths of storage medium such as magnetic tapes.

The storage system of the invention includes a number of modules, each having a plurality of tape magazines mounted on a movable support and a read-write station which is common to all magazines. The read-write station includes transducer means which is continuously driven along a circular path. Means responsive to an input address and to a position code recorded on the tapes moves a magazine to a position adjacent to the read-write station and places a tape in the magazine in operative relationship with the transducer means. More particularly, a portion of a loop of the tape is caused to lie in a plane parallel to the circular path followed by the transducer means and to extend transverse to a portion of that path. A comparison of the input address with the position code recorded on the tape indicates the displacement of the tape from its desired position and enables the tape to be driven so that the transducer means passes over the tape location called for by the address.

The invention is discussed in greater detail below and is shown in the following drawings of which:

Figure 1:
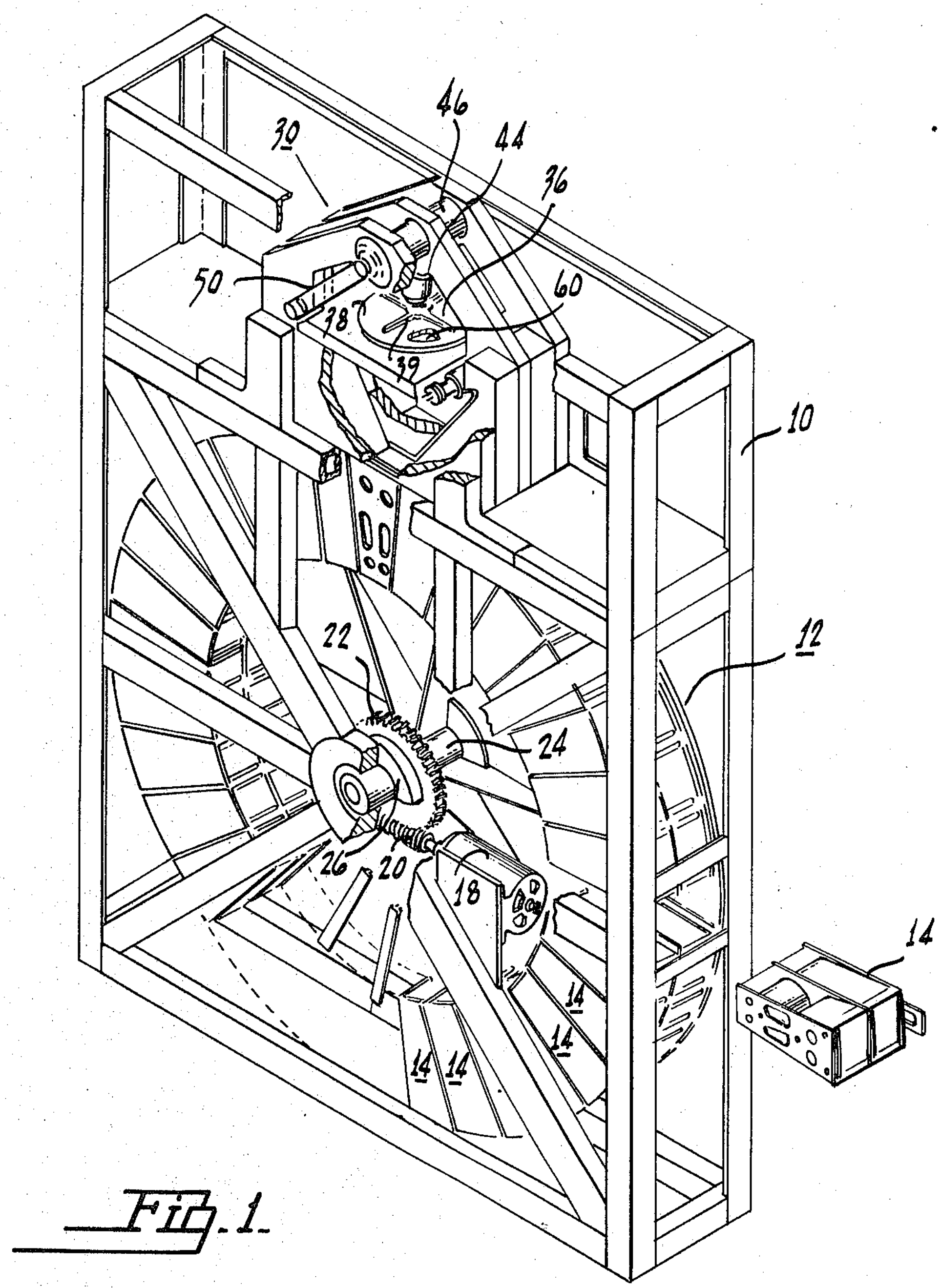
FIG. 1 is a partially broken away, perspective view of a module in the system of the invention.

The module of FIG. 1 comprises a chassis 10 and a turret 12 which is rotatably mounted in the chassis. The turret is shaped somewhat like a ferris wheel and 32 magnetic tape cartridges 14, one of which is shown removed from the turret, are removably mounted in the turret.

The means for rotating the turret includes a motor 18 which drives a pinion 20. The pinion 20 is engaged with a gear 22 which in turn is fixed to the axle 24 of the turret.

There is also associated with the turret 12, a digital shaft position encoder, shown generally at 26. This is a commercially available item which includes, for example, magnetic markings in binary coded form on the turret and read heads located on the chassis for producing signals corresponding to the recorded information, which signals are indicative of the turret position. If magnetic recording is employed, heads responsive to stationary magnetic flux as for example, Hall type heads, should be employed. As an alternative, the recorded code may be in optical form as, for example, black and white areas and the means employed for reading the code light sensitive devices. Other alternatives are also possible.

Figure 2:
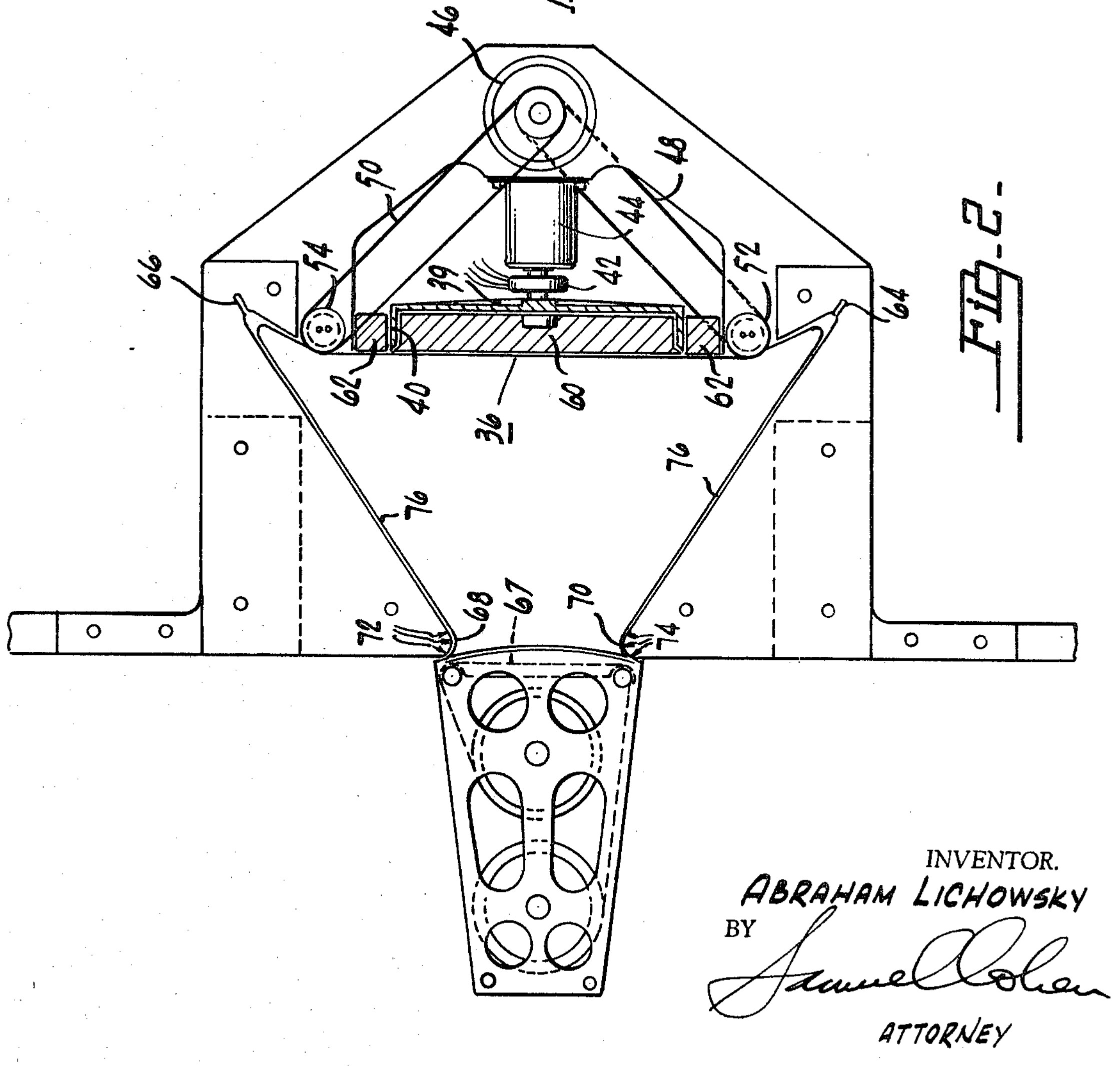
FIG. 2 is a view, partially plan and partially in section of the read-write station and one of the magazines of FIG. 1.
Figure 3:
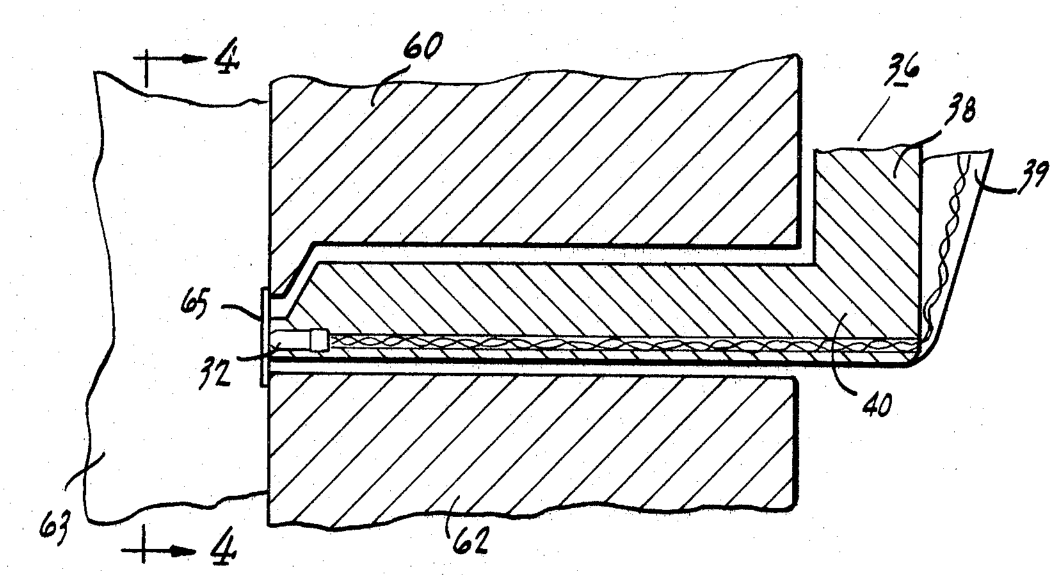
FIG. 3 is a cross-section through a portion of the read-write station of FIG. 2.

There is a single read-write station 30 which is common to all of the magazines in the module of FIG. 1. It includes a write head 32 and a read head 34, both shown schematically in FIG. 4. These two heads are mounted in a support 36, hereafter termed a "headwheel." The headwheel consists of a disk 38 having supporting ribs 39 at its upper surface and having also an annular flange 40, all as shown in FIGS. 2 and 3. The heads 32 and 34 are mounted at the bottom surface of the annular flange 40. The signals developed at the read head or to be applied to the write head are coupled to the respective heads by means of a rotary transformer 42 shown in FIG. 2.

Figure 5:
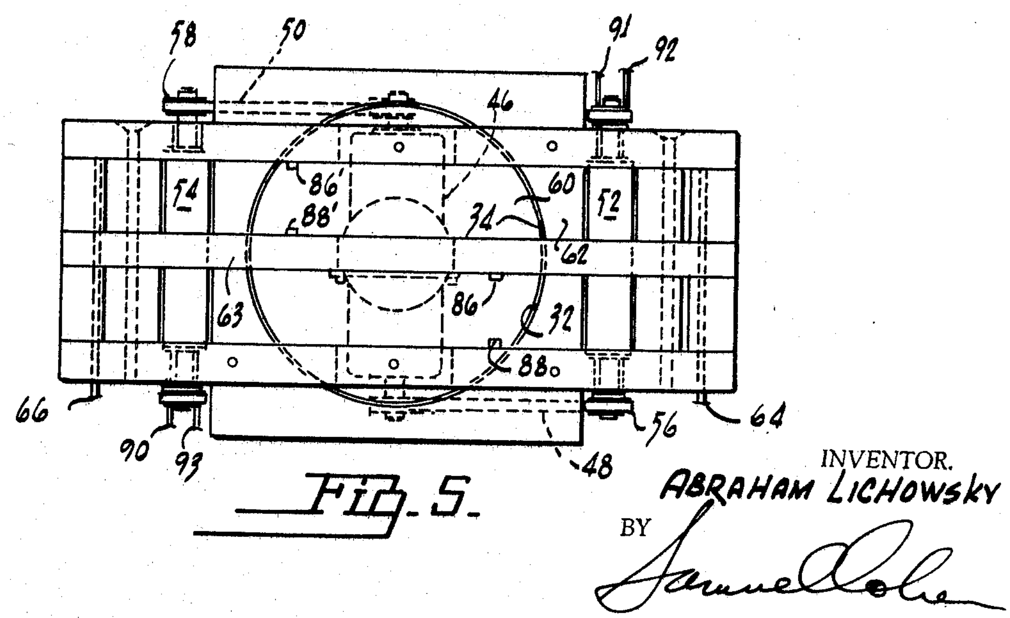
FIG. 5 is a bottom plan view of the read-write station of FIG. 2.

The headwheel 36 is rotated continuously at a high rate of speed by the motor 44, which is preferably a high quality synchronous motor. In one particular design the motor speed is 3600 revolutions per minute corresponding to a head speed of about 1500 inches per second. The read-write station also includes a second motor, this one a servo motor 46. This motor is coupled via drive belts 48 and 50 (FIG. 2) to two capstans 52 and 54. As is seen most clearly in FIG. 5, the drive belt 48 engages a pulley 56 at one end of capstan 52 whereas the belt 50 engages a pulley 58 at the opposite end of capstan 54.

Returning to FIG. 2, the flange 40 of the headwheel surrounds a circular inner supporting plate 60. An outer supporting plate 62 is located immediately outside of the flange 40 and surrounding the flange. The bottom surfaces of these two plates are aligned and provide a reference plane over which the magnetic tape passes when it is in operative position, as will be discussed shortly. The flange 40 of the headwheel is located in the annular slot between these inner and outer plates. The bottom edge of the headwheel is approximately in line with the reference plane so that the magnetic heads tend to touch the tape as the headwheel rotates. However, the pressure of the hydrodynamic air film generated between the headwheel and the tape prevents actual contact and the heads pass very closely adjacent to the tape.

As will be discussed in more detail shortly, each magazine contains dual tapes on two pairs of tape reels. There are two chambers at the read-write station, one for each such tape. The center wall between the two chambers is shown at 63 in FIG. 5 and is also shown in part in FIG. 3. This wall is formed with a shallow slot 65 (exaggerated in size in FIG. 3) to provide safety clearance for the headwheel, if the latter, during rotation, projects a slight amount beyond the reference surface.

Each chamber includes vacuum manifolds, shown at 64 and 66 in FIG. 2, located at the upper corners of the chamber. Each chamber also includes openings in the wall thereof at 68 and 70 which connect to the manifold for compressed air. When a magnetic tape is being driven, as will be discussed shortly, compressed air is forced through these openings as indicated schematically by the arrows 72 and 74, to provide air lubrication for the magnetic tape.

In the operation of the magnetic tape station, when a cartridge is in position, as shown in FIG. 2, the tape is initially in the position indicated by dashed line 67. When a vacuum is created in one of the two chambers, by operatively connecting a vacuum pump to a pair of manifolds 64 and 66, the air pressure behind one of the tapes forces a tape loop 76 into the chamber. A portion of the tape loop now lies on the reference plane formed by the inner and outer supporting plates 60 and 62, respectively, and the two capstans 52 and 54 engage portions of the tape immediately beyond the opposite edges of the outer supporting plate 62. These capstans are vacuum capstans and the vacuum created at the openings in one of the capstans (the leading one) cause the tape to adhere to that capstan. Air pressure is applied to the other capstan to cause the tape to ride on an air film over that capstan as the tape is being pulled by the leading capstan. When the servo drive motor 46 is actuated and the capstans driven, the tape is also driven.

Figure 4:
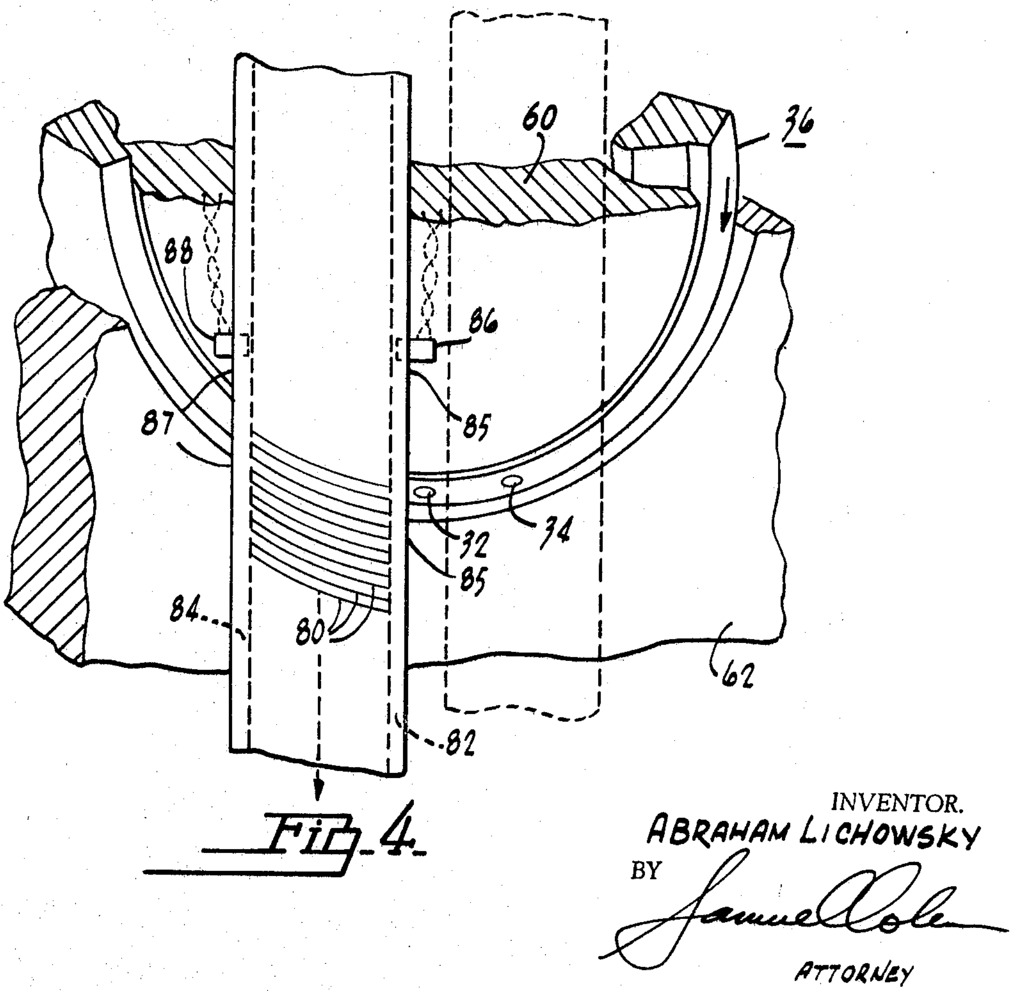
FIG. 4 is a bottom perspective view of the rotating magnetic head assembly and a portion of a length of tape. This view is taken in direction 4—4 of FIG. 3.

The position of the tape relative to the headwheel is shown most clearly in FIGS. 3 and 4. As can be seen in FIG. 4, the magnetic heads write on and read from the tape along curved tracks which extend transversely across the tape. These tracks actually occur on the surface of the tape adjacent to the heads, however, for purposes of illustration, they are shown at 80 in FIG. 4. There is also recorded along each edge portion 82 and 84 of the tape, track identification codes. These codes may be sensed by the Hall type read heads 86 and 88, respectively, which may be fixedly mounted to and flush with the surface of the inner or outer supporting plates 60 or 62.

As mentioned previously, the capstans 52 and 54 are vacuum capstans. The vacuum lines leading to these capstans are shown at 90 and 92 in FIG. 5. Each capstan is also connected to the compressed air supply shown at 91 and 93, respectively, for tape flotation and air lubrication when the capstan is not used to drive the tape. The leading capstan only drives the tape and the trailing capstan is pressurized to allow the tape to track better (conform to edge guide positions in the read-write area). When tape motion direction is reversed the vacuum and pressure supplies are also switched.

Figure 6:
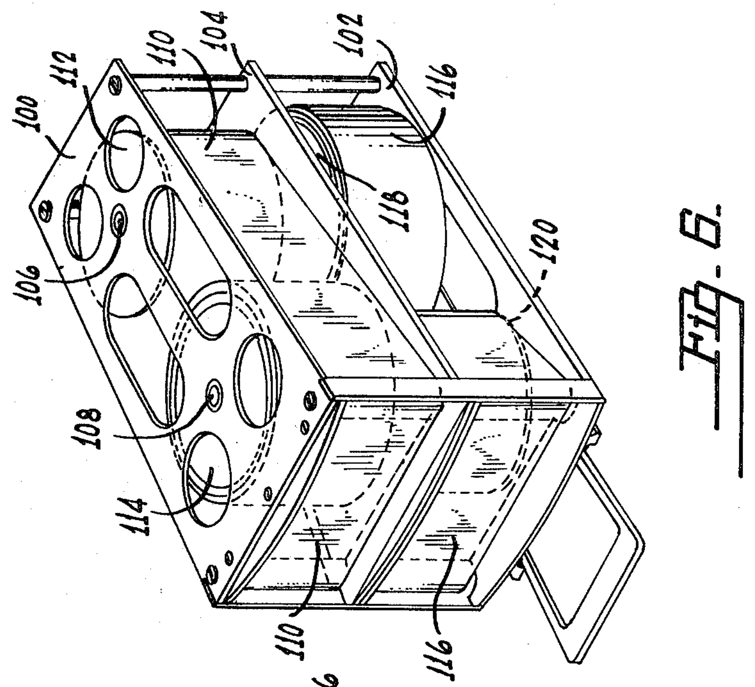
FIG. 6 is a perspective view of a tape magazine.
Figure 7:
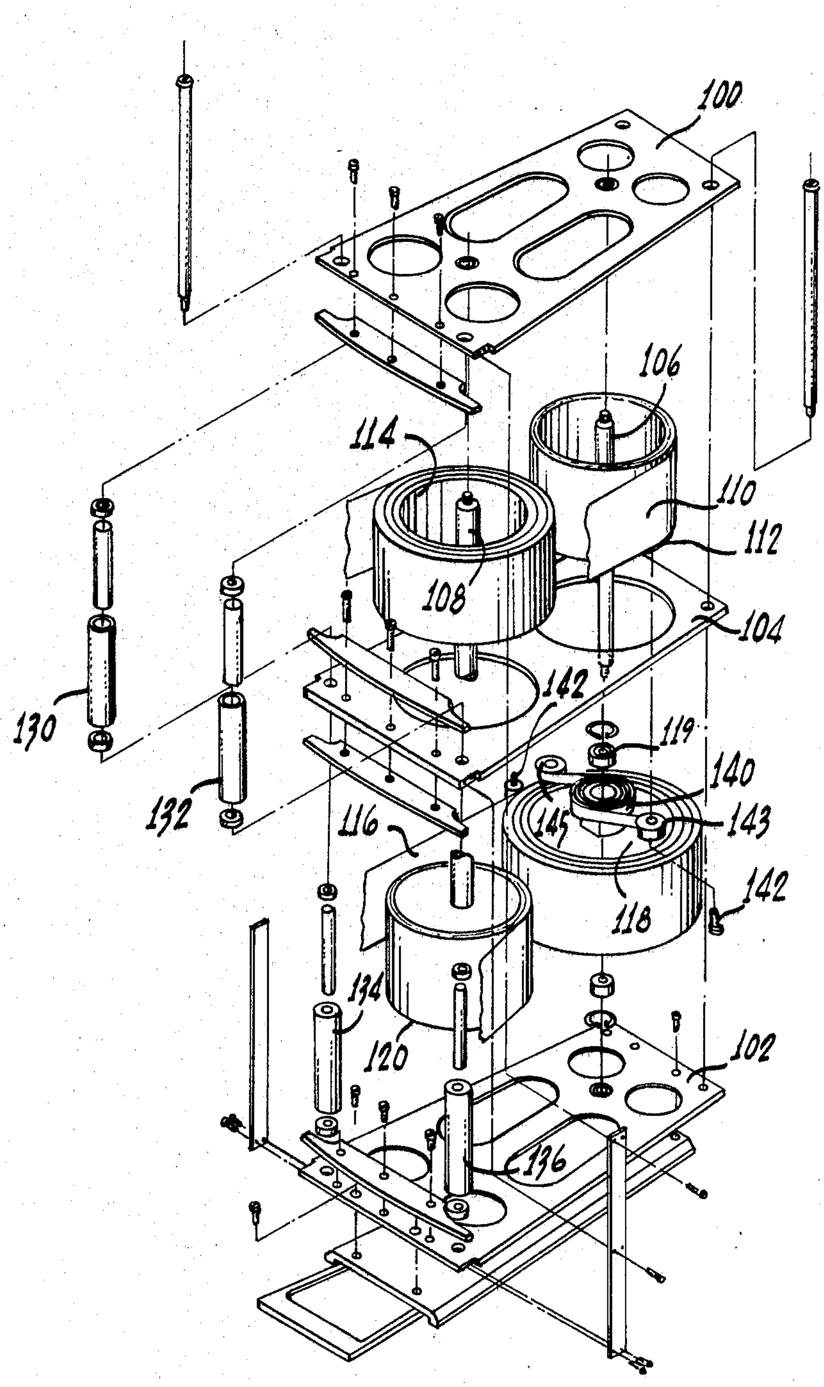
FIG. 7 is an exploded view of the tape magazine of FIG. 6, however, to make certain parts more visible, a number of the elements are not shown.

FIGS. 6 and 7 are more detailed showings of the magazine. Each magazine includes end plates 100 and 102, and a center plate 104. There are two reel supporting axle assemblies 106 and 108 which are rotatably mounted in the end plates 100 and 102. They support a first length of tape 110 which is mounted on two flangeless reels 112, 114 and a second length of tape 116 which is mounted on two flangeless reels 118 and 120.

The length of tape 110 passes over tape guides 130 and 132 and the length of tape 116 passes over tape guides 134 and 136. The reels 120 and 114 are mechanically coupled to the same shaft 108 and rotate, as a unit, with the shaft 108. The tapes are so placed on the reels that when one length of tape 110 winds up on reel 114, the other length of tape 116 unwinds from reel 120.

The reel 112 is fixed to shaft 106 and rotates with this shaft. The reel 118 is rotatably mounted to shaft 106 by the bearing assembly 119.

The tensioning means for the tape is a negator spring assembly, a commercially available item, shown at 140. The assembly consists of two springs which are interleaved and are secured to one another at their center. This center portion of the two springs is fixed to the end plate of reel 118. One of the springs is fixed at its end to a bobbin 143 and the other spring is fixed at its end to a bobbin 145. The springs are so tensioned that they always tend to wind up on their bobbins. The bobbins are rotatable about their respective pins 142 and these pins are fixed to the lower plate of reel 112 (as viewed in FIG. 7).

The tapes are placed on their reels and the negator spring initially biased in the following manner. First, the tape is wound up fully on reel 118 and the other end of the tape 116 is secured to the reel 120. Tape is also fully wound up on reel 114 but the other end of tape 110 is left free. After this, the reel 118 is held in position and the reel 112 and axle 106 are rotated in the clockwise direction. As the reel 118 is stationary while the reel 112 is being rotated clockwise, the number of preloading turns on the negator spring assembly is increased. In other words, the springs are unwound from their bobbins 143 and 145, and wind up on their center region, that is, on the region secured to the end plate of reel 118.

After rotating the reel 112 through a predetermined number of turns, reel 112 is held stationary and the end of the tape 110 is secured to reel 112. Then, the reels 112 and 118 are released. When this is done, the reel 112 rotates counterclockwise and the tape 110 tends to wind up on reel 112. This causes counterclockwise rotation of reel 114 and counterclockwise rotation of shaft 108 and reel 120. The counterclockwise rotation of reel 120 is the wind up direction for this reel and it causes the tape 116 to unwind from reel 118. Reel 118 also rotates in the counterclockwise direction and, in the process tends to unwind. The rotation of the various reels continues until approximately equal amounts of tape are on the respective reels. At this time, the system approaches torque equilibrium and tape motion stops.

The storage of approximately equal amounts of tape on the four reels of the cartridge means that the maximum tape distance which needs to be traveled for access to any track, when a tape is drawn into a read-write station is only about one-half the tape length. This reduces the average search time which is needed to one-half that needed in conventional systems (assuming the same overall tape length).

When either tape is driven by means external to the cartridge so that reel 118 is driven in the wind up direction (for example), this causes the reel 114 also to be driven in the wind up direction and the reels 112 and 120 to unwind. When the tape drive is stopped and/or decoupled from the tapes, the negator spring assembly associated with reels 112 and 118 tends to drive all the reels back to their original position because any winding from the original position sets up increasing tension unbalance.

Figure 9:
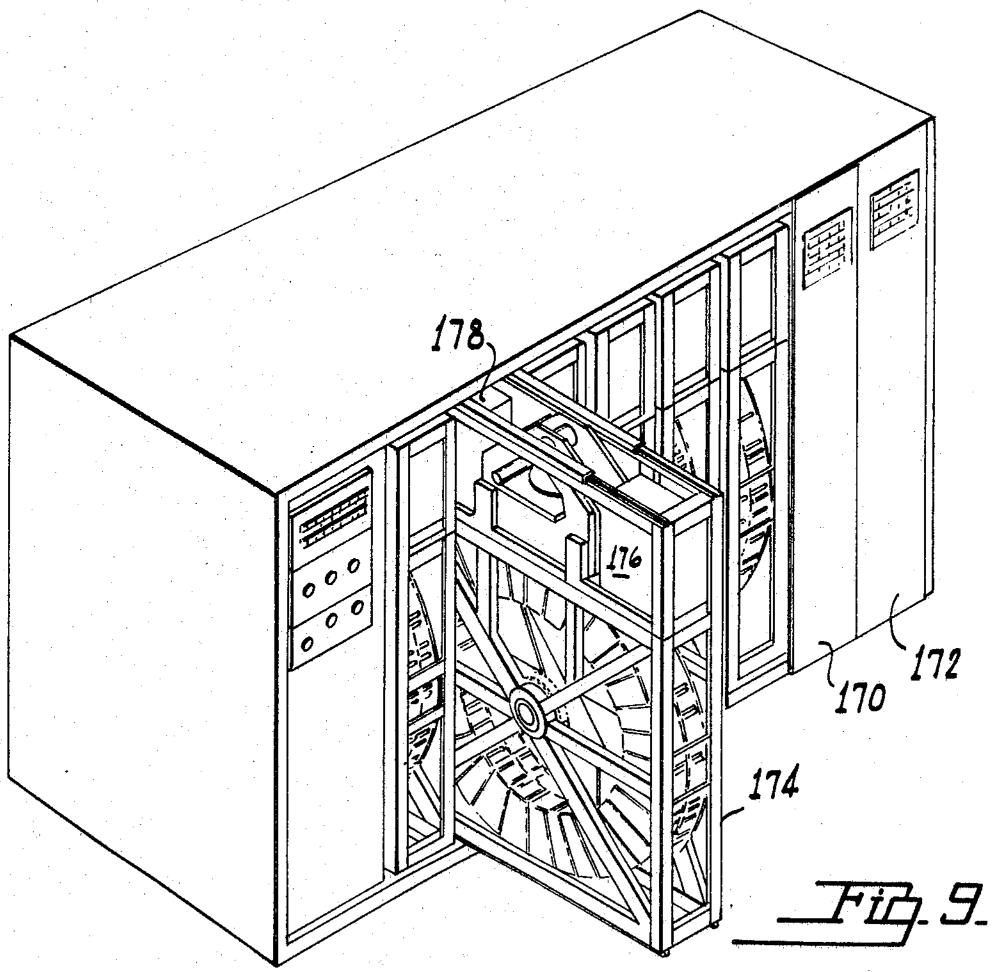
FIG. 9 is a perspective showing of a number of mechanical details of the overall system of the present invention.
Figure 8:
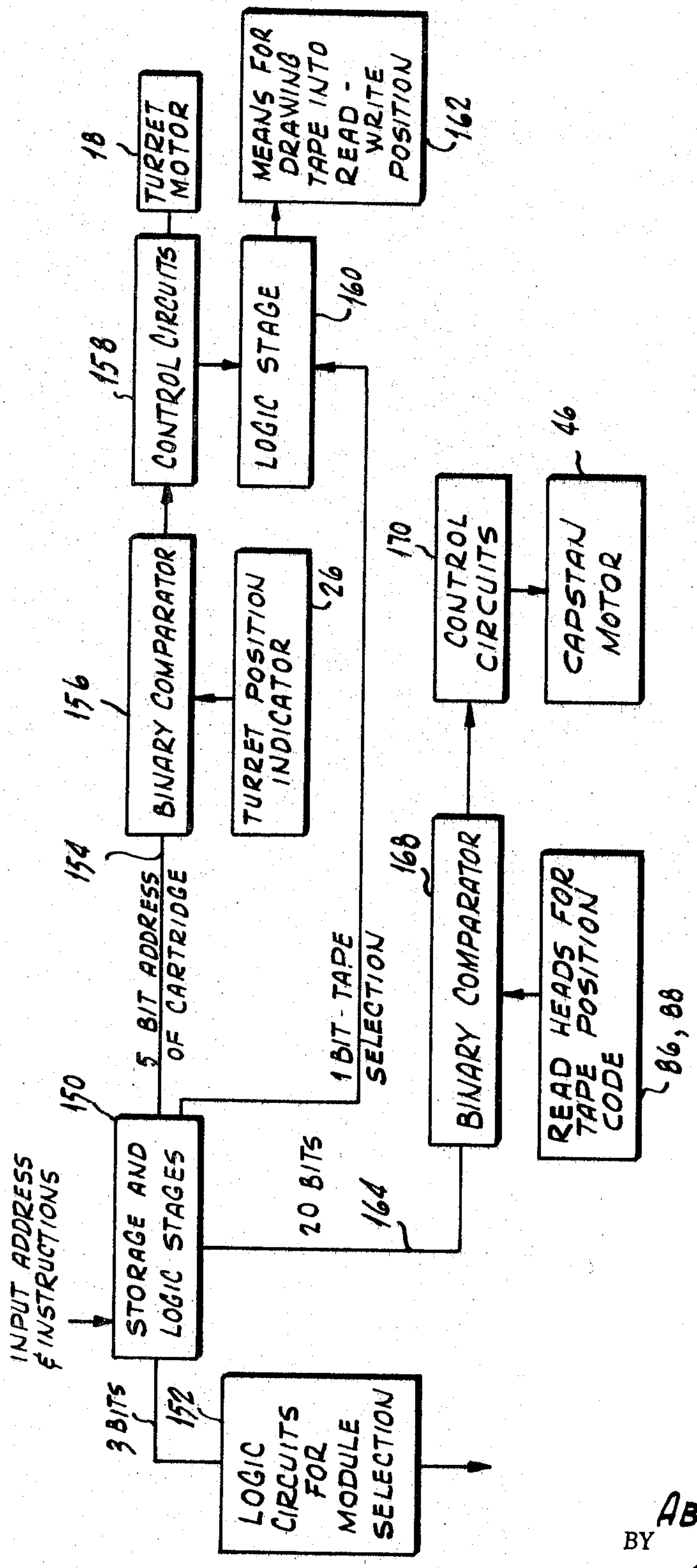
FIG. 8 is a block circuit diagram of certain details of the control system of the present invention.

The control system for selecting a desired tape and a portion of that tape is shown in FIG. 8. A 29 bit input address is applied to the storage and logic stages 150. These stages also may store program instructions, however, these will not be dealt with here as they, per se, are conventional and are not part of the present invention. Three bits of the 29 bits are employed to select 1 out of 8 modules. The 8 modules are shown in FIG. 9 and the circuits for performing the selection are shown at block 152 in FIG. 8 and legended "logic circuits for module selection."

Five bits of the input address are for the purpose of selecting 1 out of 32 magazines. (Note that this specific figure and others given for purposes of illustration are merely examples as more or less than the stated numbers of bits may be employed depending upon system parameters and the type of circuits employed.) These bits are applied via a cable 154 to the binary comparator 156. The second input to the binary comparator 156 is five bits from the turret position indicator 26. The output of the binary comparator is applied to the control circuits 158 which supply power to the turret motor 18.

In the operation of this portion of the control system, when the binary comparator output differs from zero, the control circuits 158 drive the turret motor 18 and the latter moves the cartridge of interest toward the read-write station. The turret motor slows down as the desired magazine approaches the read-write station and comes to rest when it is at the read-write station. (While not essential, mechanical detents or latches (not shown) and/or analog circuits may be employed finally to position the turret so that the selected cartridge is precisely positioned when it comes to rest.) At this time, the binary comparator output is zero.

One bit of the input address is for the purpose of selecting one of the two tapes in a magazine. This bit is applied to logic stage 160. The second input to stage 160 is an output from control circuits 158. When the desired cartridge is at the read-write station, the logic stage 160 produces an output which actuates the means shown by the single block 162. The latter includes means for applying a vacuum to the read-write station for drawing the tape selected into the vacuum chamber, as shown in FIG. 2. Air pressure is also applied to the ports 68 and 70 to air lubricate the tape after it is in the position shown in FIG. 2. This facilitates the subsequent movement of the tape as its driven by capstans 52 and 54.

Twenty bits of the input address are applied via cable 164 to binary comparator 168. The second input to the binary comparator is the output of the read heads 86 and 88 of FIG. 4 (or the output of read heads 86′, 88′ of FIG. 5 if the other tape of the magazine is the selected tape). The output of the binary comparator 168 is applied to control circuits 170 for the capstan motor 46. These control circuits are conventional servo circuits which include rate feedback circuits, and they cause the capstan motor quickly and accurately to drive the tape to the read-write position.

After the magnetic tape is at the read-write position, it is driven in accordance with the instructions of a stored program. Depending upon the particular system involved, the tape may be driven intermittently or continuously until a complete block of information is read from or written on the tape. To insure accuracy in the written information, the tape may be operated in "read after write" mode. The information is written by the write head 32 of FIG. 4 and read immediately thereafter by the read head 34. The spacing of the two heads, their positions, and the tape speed are so chosen that the write head and read head align with the same track.

After a read or write operation is completed, air is admitted to the vacuum chamber in which the selected tape is located and the negator spring assembly thereupon quickly returns the tape reels to their original positions. In the process, the tape loop is quickly withdrawn from the vacuum chamber. Upon receipt of a new address, the tape selection process again can commence. This may involve either drawing the other tape in the same cartridge into the other vacuum chamber or moving a new cartridge into position.

A complete system is shown in FIG. 9. Six of the modules are shown with their front panels removed and the other two modules 170 and 172 are in their normal operating positions. One of the modules 174 is shown partially withdrawn from its cabinet. The two chassis 176 and 178 at the upper left and upper right portions of the module contain the control and other circuits for the module.

Aside from the extremely high storage capacity which is possible in the system of the present aplication, it has a number of other advantageous operating characteristics. The recording technique employed has all of the advantages of other transverse scan techniques such as quadruplex video recording and helical scan recording with two additional major simplifications which make it especially suitable for use as a high speed random access system. One is that the tape is not threaded through mechanical aperatures thus permitting reliable and rapid engagement and disengagement of tapes with the read and write heads at the read-write station and greatly simplifying tracking. The other is that the time base stability is greatly improved due to the absence of severe geometrical distortions which are typical of the other transverse scan technique mentioned above. There is essentially no geometric distortion because the tape is maintained flat and in one plane over a large portion of its extent surrounding the portion at which reading and writing occurs.

Another feature of the present system is that the tape is held under essentially constant tension throughout the system by the negator spring assembly and is held in tension equilibrium by the proportional vacuum isolation chambers (the tapered portions of the chambers adjacent to the vacuum manifolds 64 and 66 in FIG. 2). Tension in the direction of of the opposing vacuum isolation chambers holds the tape flat against the reference surface and a few judiciously distributed small vacuum apertures on the reference surface, for example, at the tape edge portions 85 and 87 in FIG. 4, insure good tape contact in the vicinity of the address decoding read heads such as 86 and 88 which are mounted flush in the reference surface near both edges of the tape. Additional vacuum apertures may also be employed to insure good tape contact at the rotating headwheel annular flange.

The storage capacity of the system described above depends upon the tape length, the bit packing density, the number of cartridges and the number of modules. In one particular design, each tape is 300 ft. in length and is 2 inches wide. Each curved track is approximately 2.1 inches long and there are approximately 200 tracks per inch. The bit packing density may be 2000 bits per inch of track length. Accordingly, the storage capacity per length of tape is approximately 2000 bits/inch$\times$2.1 inches/track$\times$200 tracks/inch$\times$3600 inches$\cong 3\times10^9$ bits. The storage capacity per module is $3\times10^9$ bits/tape$\times$2 tapes/cartridge$\times$32 cartridges/module$\cong 1.9\times10^{11}$ bits. The storage capacity for a system comprising eight modules, as shown in FIG. 9, is $8\times1.9\times10^{11}$ bits$\cong 1.5\times10^{12}$ bits.

What is claimed is:

1. A storage system comprising, in combination:

a plurality of tape magazines located on a movable support, each tape magazine including at least one length of tape mounted on two reels and also including biasing means for normally biasing the reels so that each reel holds approximately one-half the length of tape;

a read-write station common to all magazines and including transducer means continuously driven along a circular path located in a given plane;

means responsive to an input address for moving said support to place a given one of said tape magazines in operative relationship with said read-write station;

means for removing a loop of tape from said given one of said magazines and placing a portion of said loop in a plane parallel and immediately adjacent to said given plane and extending across said circular path; and means responsive to said input address for driving said tape to a position such that the transducer means passes over a location on the tape called for by said address.

2. A storage system as set forth in claim 1, wherein each magazine includes a second length of tape mounted on a second pair of reels, said two pair of reels being coupled to one another and being spring biased in such manner that each reel of tape normally holds approximately one-half of the length of its tape and the wind-up direction of one reel of one pair of such reels corresponds to the unwind direction of the corresponding reel of the other said pair of reels.

3. A storage system as set forth in claim 1, wherein there is a position code recorded along at least one edge of each tape and wherein said last-named means responsive to an input address is responsive also to said position code for driving the tape selected to the position such that the transducer means passes over a location on said tape called for by said address.

4. A storage system as set forth in claim 1, wherein said movable support comprises a circular turret with said magazines mounted to the outer circumferential portion of the turret.

5. A storage system as set forth in claim 4, wherein each said magazine is removably mounted in said turret.

6. A storage system comprising, in combination:
a plurality of tape magazines located on a movable support;
a read-write station common to all magazines and including transducer means continuously driven along a circular path located in a given plane and a vacuum chamber adjacent to said circular path;
means responsive to one portion of an input address and to a position code recorded on said movable support for moving said support to place a given tape magazine in operative relationship with said read-write station;
means responsive to another portion of said address for creating a vacuum at said vacuum chamber to cause a loop of tape from said given magazine to pass into said chamber and a portion of said loop to lie in a plane parallel and immediately adjacent to said given plane, and extending across said circular path; and
means responsive to another portion of said input address and to a position code recorded on said tape for driving the tape to a position such that said transducer means passes over a location thereon called for by said last-named portion of said input address.

References Cited

UNITED STATES PATENTS

| | | | |
|---|---|---|---|
| 3,349,385 | 10/1967 | Studley | 179—100.2 |
| 3,127,178 | 3/1964 | Osborne et al. | 179—100.2 |
| 2,743,318 | 4/1956 | De Forest | 179—100.2 |
| 2,900,132 | 8/1959 | Burns et al. | 340—174.1 |
| 3,183,494 | 5/1965 | Welsh | 340—174.1 |
| 3,235,264 | 2/1966 | Mikrut | 242—55.13 |
| 3,252,669 | 5/1966 | Geri | 242—55.13 |
| 3,314,729 | 4/1967 | Baumeister et al. | 340—174.1 |
| 3,337,106 | 8/1967 | Berryman | 226—95 |

OTHER REFERENCES

Nejezchleb, V.: "Random Access Multi-Reel Tape Drive," IBM Technical Disclosure Bulletin, vol. 6, No. 9, February 1964.

BERNARD KONICK, Primary Examiner

W. F. WHITE, Assistant Examiner

U.S. Cl. X.R.

179—100.2; 226—95; 242—199